Patented Feb. 19, 1924.

1,483,875

UNITED STATES PATENT OFFICE.

HUGO GALLINOWSKY, OF ST. LOUIS, MISSOURI, ASSIGNOR TO EUGENE A. HEITKAMP, OF ST. LOUIS, MISSOURI.

METHOD OF TREATING GYPSUM-CEMENT SURFACES.

No Drawing.   Application filed April 14, 1923.   Serial No. 632,163.

*To all whom it may concern:*

Be it known that HUGO GALLINOWSKY, a citizen of the United States of America, residing at St. Louis, State of Missouri, has invented certain new and useful Improvements in Methods of Treating Gypsum-Cement Surfaces, of which the following is a specification.

The object of my invention is to devise a process of hardening and crystallizing gypsum cements so that their surface can be easily polished and be made to resemble polished marble, granite or alabaster. My method can be used on any colored gypsum without altering or changing the color. My method finds particular application when used with marbleized or plain tinted walls either light or dark in color.

With these and other objects in view, my invention has relation to certain novel methods as will be hereinafter more fully described and pointed out in the claims.

In applying my method a solution of thiosulfate of sodium is used in a proportion of one part by weight of the sulphate of sodium to four parts of water.

Immediately after the gypsum cement has been placed in position and after the setting is completed, I saturate the surface with the solution indicated and after a short period of time wash it off with water.

In applying my method to a surface of dark color the solution of thiosulfate of sodium and water may be made with a smaller percentage of thiosulfate sodium.

What I claim and mean to secure by Letters Patent is:

1. A method of treating gypsum cement surfaces which consists in saturating the surface immediately after it has set with a solution of thiosulfate of sodium and then washing the surface after a short time interval.

2. In a method of treating gypsum cement surfaces the application of a solution of one part of thiosulfate of sodium to four parts of water immediately after the setting of the gypsum cement surface and subsequently washing the surface with water.

3. A method of treating gypsum cement surfaces which consists in washing the surface with a solution of thiosulfate of sodium and later washing the surface with water.

In testimony whereof I affix my signature.

HUGO GALLINOWSKY.